US007869646B2

(12) United States Patent
Park et al.

(10) Patent No.: US 7,869,646 B2
(45) Date of Patent: Jan. 11, 2011

(54) METHOD FOR ESTIMATING THREE-DIMENSIONAL POSITION OF HUMAN JOINT USING SPHERE PROJECTING TECHNIQUE

(75) Inventors: Chang-Joon Park, Daejon (KR); Hong-Seok Kim, Seoul (KR); In-Ho Lee, Daejon (KR); Jae-Kwang Lee, Daejon (KR); Hyun-Bin Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1078 days.

(21) Appl. No.: 11/605,612

(22) Filed: Nov. 29, 2006

(65) Prior Publication Data
US 2007/0126743 A1 Jun. 7, 2007

(30) Foreign Application Priority Data
Dec. 1, 2005 (KR) ...................... 10-2005-0116140
May 19, 2006 (KR) ...................... 10-2006-0045045

(51) Int. Cl.
*G06K 9/00* (2006.01)
(52) U.S. Cl. ...................................... 382/154; 382/103
(58) Field of Classification Search .................. 382/154
See application file for complete search history.

(56) References Cited
U.S. PATENT DOCUMENTS
6,088,042 A 7/2000 Handelman et al.

6,226,388 B1 5/2001 Qian et al.
7,257,237 B1 * 8/2007 Luck et al. .................. 382/103
2003/0215130 A1 11/2003 Nakamura et al.

FOREIGN PATENT DOCUMENTS
JP 05-298422 A 11/1993
KR 1019980060109 A 10/1998

(Continued)

OTHER PUBLICATIONS

Kim et al: "MIMIC: real-time maker-free motion capture system to create an agent in the virtual space", Proc., ICCE'02, IEEE, 2002.*

(Continued)

*Primary Examiner*—Samir A. Ahmed
*Assistant Examiner*—Ruiping Li
(74) *Attorney, Agent, or Firm*—Ladas & Parry LLP (57) ABSTRACT

A method for estimating three-dimensional positions of human joints includes the steps of: a) marker-free motion capturing a moving figure for obtaining a multiview 2D image of the moving figure, and extracting a 2D feature point corresponding to a bodily end-effector; b) three-dimensionally matching the 2D feature point corresponding to the bodily end-effector, and recovering the 3D coordinates of the bodily end-effector; c) generating a 3D blob of the bodily end-effector, generating a virtual sphere with a radius that is a distance from a center of the 3D blob to a joint, and projecting the virtual sphere onto the obtained multiview 2D image of the moving figure; and d) detecting a coinciding point of a surface of the projected virtual sphere and the multiview 2D image of the moving figure, and estimating a 3D position corresponding to the coinciding point as a 3D position of the joint.

12 Claims, 6 Drawing Sheets

FOREIGN PATENT DOCUMENTS

| KR | 1020000017755 A | 4/2000 |
|---|---|---|
| KR | 10-2000-0074633 | 12/2000 |
| KR | 10-2001-0102881 | 11/2001 |
| KR | 10-2002-0035386 | 5/2002 |
| KR | 10-2002-0095867 | 12/2002 |
| KR | 1020030068444 A | 8/2003 |
| KR | 1020040008379 A | 1/2004 |
| KR | 1020040055310 A | 6/2004 |

OTHER PUBLICATIONS

Cheng, S., et al., "Hand Pose Estimation Using Expectation-Constrained-Maximization from Voxel Data." 2004. *Hand Pose Estimation Technical Report 2004, CVRP Laboratory*, pp. 1-7.

Azarbayejani, A., et al., "Real-Time Self-Calibrating Stereo Person Tracking Using 3-D Shape Estimation from Blob Features." 1996. *IEEE Proceedings of ICPR 1996*, pp. 627-632.

Park, C.J., et al., "Real-Time Marker-free Motion Capture System Using Blob Feature Analysis and Inverse Kinematics." Feb. 2003. *FVC2003*, vol. 9, No. 1.

Matusik, W., et al., "Image-Based Visual Hulls." 2000. *Siggraph 200*, pp. 369-374.

Cheung, K., et al., "Shape-Form-Silhouette Across Time Part I: Theory and Algorithms." 2005. *International Conference of Computer Vision*, vol. 62, No. 3, pp. 221-247.

Wren, C., et al., "Pfinder: Real-time tracking of the human body." 1996. *Automatic Face and Gesture Recognition*, pp. 51-56.

Youngmo Han; 3D Pose Estimation of a Human Arm for Human-Computer Interaction Application of Mechanical Modeling Techniques to Computer Vision Paper of The Institute of Electronics Engineers of Korea, vol. 42, Issue 4, pp. 11-18, Jul. 2005.

Hun-Tae Choi; "3D Stereoscopic Image Generation Technology" www.kipi.or.kr, 2001.

\* cited by examiner

METHOD FOR ESTIMATING THREE-DIMENSIONAL POSITION OF HUMAN JOINT USING SPHERE PROJECTING TECHNIQUE

FIELD OF THE INVENTION

The present invention relates to a method for estimating a three-dimensional (3D) position of a human joint using a sphere projecting technique; and, more particularly, to a method for estimating a 3D position of a human joint, e.g., an elbow, knee, shoulder, etc., which uses an actual distance ratio to position the joint on a spherical surface to generate a virtual sphere, and position the virtual sphere in a two-dimensional (2D) image of the moving figure to estimate the intersecting point as the 3D position of the joint, allowing the position of a human joint to be accurately determined three-dimensionally in real time.

DESCRIPTION OF RELATED ART

Conventional techniques of determining the position of a human joint include position detecting techniques using markers, colors, and inverse kinetics. Brief descriptions of these techniques and their related problems will be given below.

First, in the position detecting technique using markers, the positions of markers attached to human joints are detected. This involves attaching markers, for example, infrared reflectors/emitters, ultrasonic emitters, magnetic sensors, or fiber optics, on the moving figure's joints, such as elbows and knees, and extracting the position data of the markers to locate the position of the joints, thereby easily determining the positions of the joints corresponding to the markers. In this technique, however, because a moving figure is filmed wearing clothes on which the markers are fitted, the movements of the figure are restricted. Also, because special lighting must be installed in addition to the markers and sensors for accurate position measurements, the overall cost of the system increases.

In the position detecting technique using color data, color data is extracted from the moving figure's silhouette image. This involves extracting color data using silhouette images inputted into multiple cameras to determine the positions of human joints. The technique does not require markers, sensors, or other equipment, and detects the positions of the human joints using only color data. In this technique, however, it is difficult to accurately measure position of joints using only color data that differentiates between bodily portions.

Figure 8:
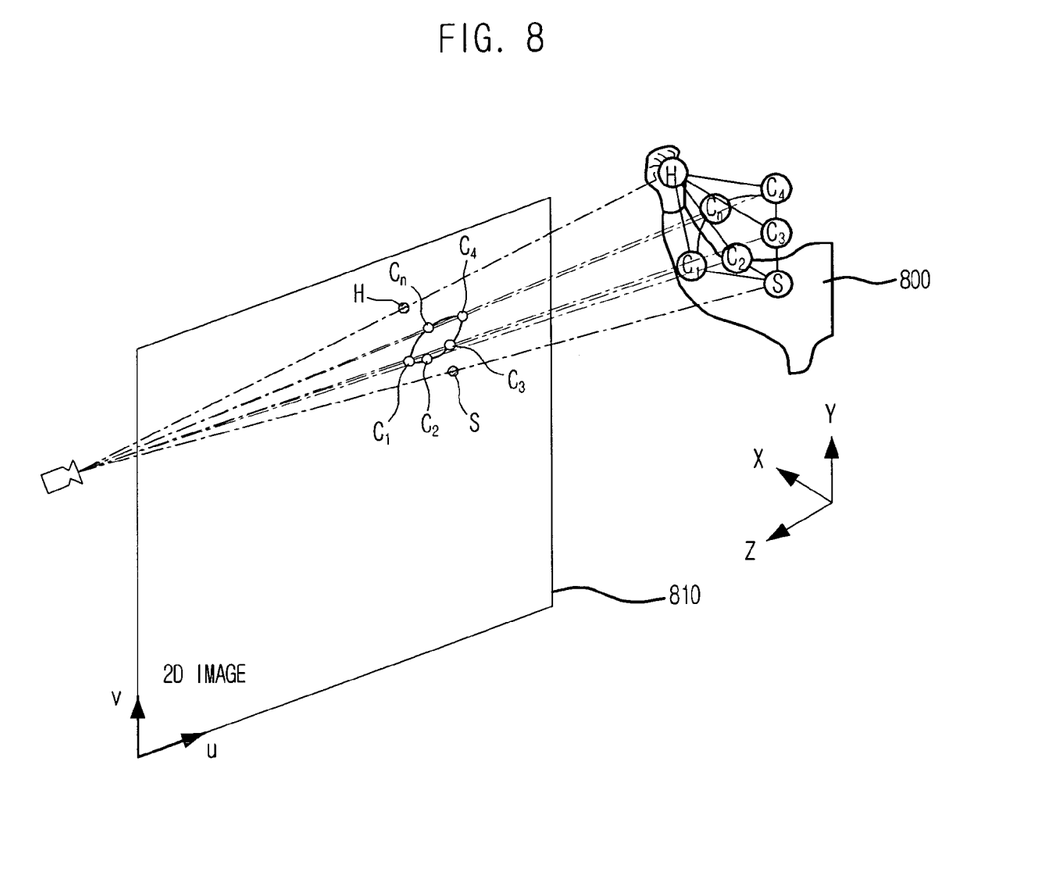
FIG. 8 is a view illustrating a 3D position estimating method of an elbow joint using inverse kinematics in accordance with the related art.

In the position detecting technique using inverse kinematics, the positions of human joints are measured from detected bodily end portions using inverse kinematics. This involves filming a moving figure without markers to detect end effectors, for example, a head, hands, feet, torso, arms, and legs, from the filmed 2D image, and extracting the position of joints from the detected end effectors using inverse kinetics, so that positions of human joints can be easily determined without markers or sensors. Hereinafter, a description will be made about a conventional method for estimating a position of an elbow using inverse kinetics with reference to FIG. 8. FIG. 8 is a diagram of a conventional 3D position estimating method of an elbow joint using inverse kinematics. The conventional method for estimating the 3 Dimensional position of an elbow joint involves using a marker-free motion capture to detect a 3D position of a hand (H) and shoulder (S) with respect to the moving figure by using inverse kinematics on the detected 3D positions of the hand (H) and shoulder (S) to estimate 3D positions of the elbow $C_1$, $C_2$, $C_3$, $C_4$, ... $C_n$. However, in this conventional method, there are bodily end-effectors such as shoulders hips, etc., that cannot be accurately detected using inverse kinematics. Therefore, the human joint positions are difficult to accurately measure using computer vision technology.

SUMMARY OF THE INVENTION

It is, therefore, an object of the present invention to provide a method for estimating a 3D position of a human joint, e.g., an elbow, knee, shoulder, etc., which uses an actual distance ratio to position the joint on a spherical surface to generate a virtual sphere, and position the virtual sphere in a 2D image of the moving figure to estimate the intersecting point as the 3D position of the joint, allowing the position of a human joint to be accurately determined three-dimensionally in real time.

In accordance with an aspect of the present invention, there is provided a method for estimating three-dimensional (3D) positions of human joints using a sphere projecting technique, including the steps of: a) marker-free motion capturing a moving figure for obtaining a multiview 2D image of the moving figure, and extracting a 2D feature point corresponding to a bodily end-effector from the obtained multiview 2D image of the moving figure; b) three-dimensionally matching the 2D feature point corresponding to the bodily end-effector, and recovering the 3D coordinates of the bodily end-effector; c) generating a 3D blob of the bodily end-effector by using the recovered 3D coordinates, generating a virtual sphere with a radius that is a distance from a center of the 3D blob to a joint, and projecting the virtual sphere onto the obtained multiview 2D image of the moving figure; and d) detecting a coinciding point of a surface of the projected virtual sphere and the multiview 2D image of the moving figure, and estimating a 3D position corresponding to the coinciding point as a 3D position of the joint.

The present invention provides a method for accurately detecting 3D positions of human joints in real time without using attached markers or sensors, so that it can detect the 3D position of an elbow joint using marker-free motion capture.

For this end, a virtual sphere is generated which derives a 3D position for positioning a human joint, e.g., elbows, knees, or shoulders, on the surface of the sphere. Then, the virtual sphere is projected on the image of the moving figure, and the position of a joint is estimated to be the position of the moving figure's detected silhouette image that intersects with the portion of the sphere. The detected silhouette image of only the moving figure and the 2D image positioned on the surface of the sphere are matched, and the matching positions thereof are verified as the position of the joint, so that an accurate 3D position of a human joint can be determined.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

The above-described objects, characteristics, and advantages of the invention will become apparent from the following description of the embodiments with reference to the accompanying drawings, which is set forth hereinafter. The invention may, however, be embodied in many different forms and should not be construed as being limited to the embodiments set forth herein; rather, these embodiments are provided to fully convey the concept of the invention to those skilled in the art. Also, in the description of the present invention, descriptions of related and published skills shall be omitted when they are deemed to induce unclearness in the purpose of the inventive description.

Figure 1:
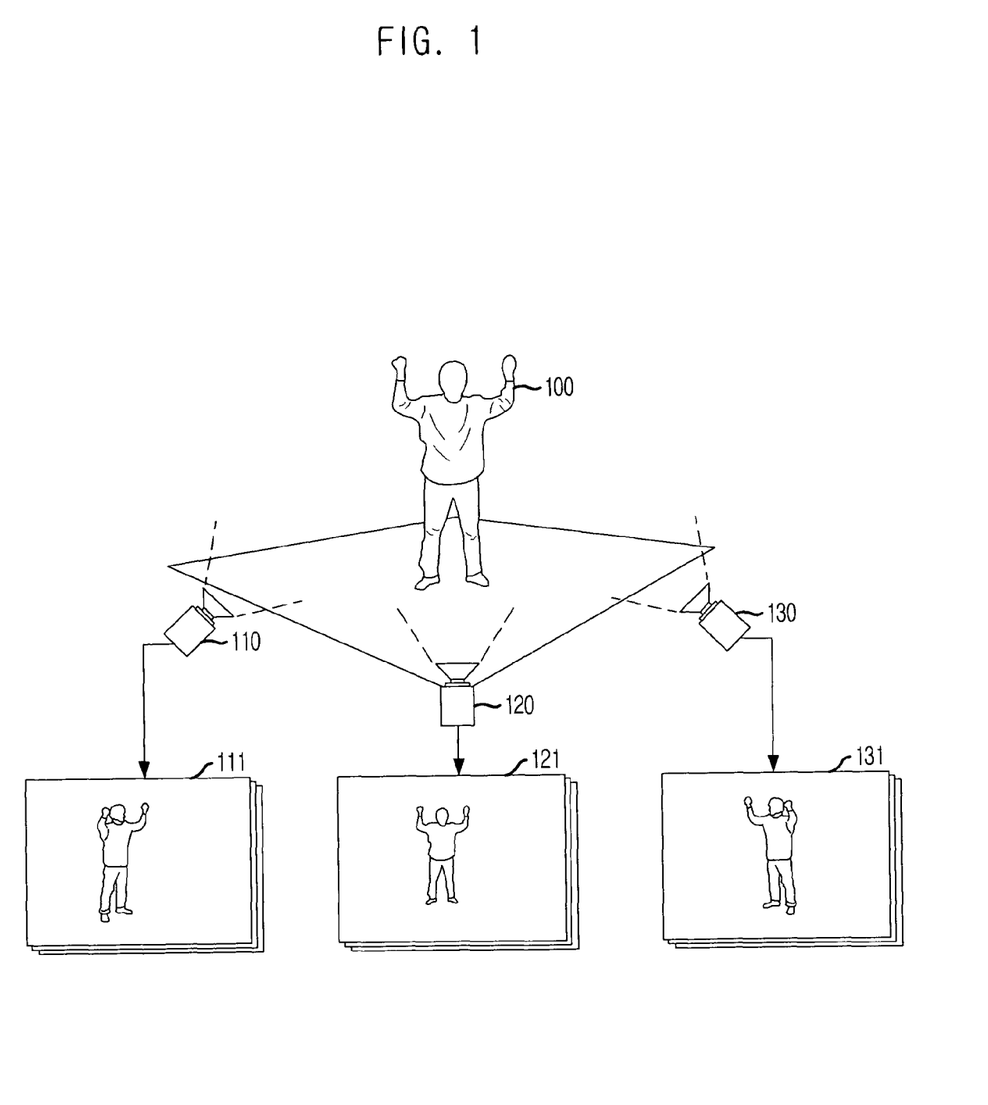
FIG. 1 is a view of a camera shot using marker-free motion capture in accordance with an embodiment of the present invention.
Figure 2:
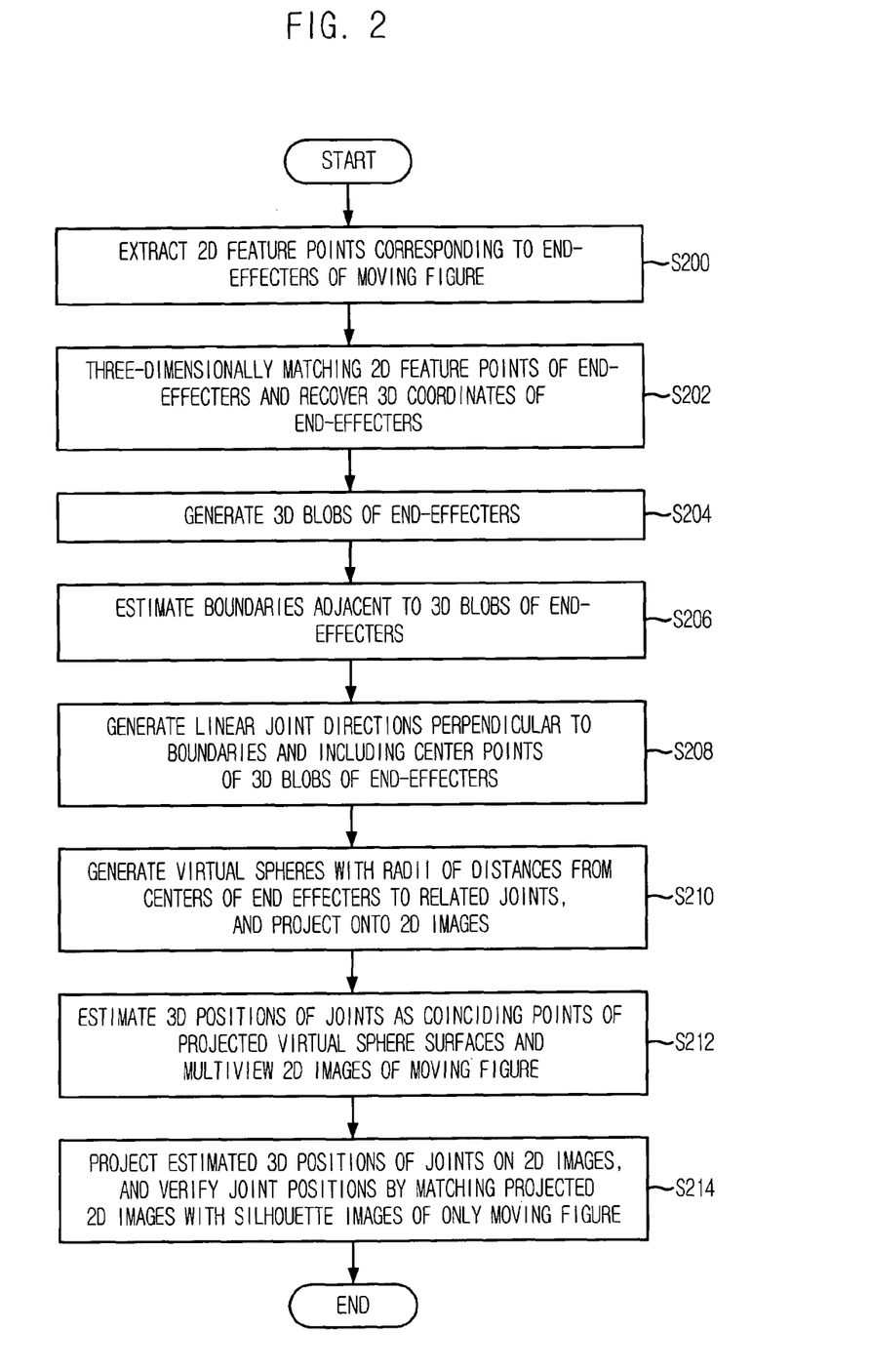
FIG. 2 is a flowchart illustrating a method for estimating a 3D position of human joint using a sphere projecting technique in accordance with an embodiment of the present invention.

FIG. 1 is a view of a camera shot using marker-free motion capture in accordance with an embodiment of the present invention, and FIG. 2 is a flowchart illustrating a method for estimating 3D position of human joint using a sphere projecting technique in accordance with an embodiment of the present invention. A description will be given with reference to FIGS. 1 and 2.

The present invention uses a marker-free motion capture to estimate a 2D feature points corresponding to end-effectors of a moving figure in step S200, then recovers 3D data from the 2D feature points of the estimated end-effectors in step S202, and performs a detecting process of the 3D positions of the human joints in steps S204 to S214.

Hereinafter, the method for detecting the 3D positions of human joins in accordance with an embodiment of the present invention will be described in detail.

First, a moving figure is marker-free motion captured, and 2D feature points corresponding to the bodily end-effectors of the moving FIG. 100 in multiview 2D images of the moving figure taken at mutually different angles are extracted, and the distances between the centers of the end-effectors and the joints are calculated in step S200. This process will be described with reference to FIG. 1.

Referring to FIG. 1, the moving FIG. 100 is filmed with a plurality of cameras from different angles. That is, a plurality of cameras 110, 120 and 130 are used to obtain image data without the moving FIG. 100, and then only the image data of the moving FIG. 100 from images of the moving FIG. 100 including the background, using the image data of the pre-filmed background only, is extracted and obtained. The filmed images 111, 121 and 131 obtained from the plurality of cameras 110, 120 and 130 include multiview 2D images of the moving FIG. 100 from respectively different angles. The multiview 2D images of the moving figure are used in the position detecting process in step S214 of FIG. 2 that uses the multiview 2D images of the moving figure.

In order to accurately extract image data of 3D movement, a calibration process of the multiple cameras 110, 120 and 130 is needed. The calibration process of the cameras involves calculating the respective positions, dispositions, and focal distances of the cameras 110, 120 and 130 that are a uniform distance from the moving FIG. 100, and performing the calibration with the relations between the neighboring cameras in mind.

After the calibration process of the cameras is performed, 2D feature points of the end-effectors of the moving FIG. 100 are extracted from the multiview 2D images of the moving figure obtained through the plurality of cameras 110, 120 and 130 at different angles, and the end-effectors are stored by body part.

Next, a description of the calculating process of the distances from the end-effectors to the middle of the joints will be given. The distance values from the centers of the bodily end-effectors to the joints are calculated in step S200 by measuring distance values, e.g., height, reach, etc, of the figure in the images of the moving figure in the initial motion capture, and using the measured distance values of the figure and distance ratios of the figure. For example, to calculate the distance from a hand to an elbow, the distance value from the center of the hand to the elbow joint is calculated by using a ratio of a reach distance value to a height distance value. First, the reach distance of the arms (the distance from the center between the hands to each hand) is measured from an image of the moving figure with both arms spread from the different images of the moving figure in an initial motion capture, and the distance between the center of a hand and an elbow joint is calculated using a height distance ratio of the measured arm reach distance, i.e., the ratio of the reach to the distance between the hand to the elbow. In the same way, distance values to other bodily joints can be calculated.

The 2D feature points of the bodily end-effectors extracted in step S200 are matched three-dimensionally, and 3D coordinates are recovered. Specifically, computer vision technology is used to separate the moving FIG. 100 from the background in the image data of the moving figure, 2D feature points of each bodily end-effector, e.g., hands, feet, head, torso, arms, legs, etc., are extracted, and the extracted 2D feature points are matched three-dimensionally to recover 3D coordinates.

The 3D coordinates recovered in step S202 are used to generate 3D blobs of the bodily end-effectors including position and volume data of the end-effectors in step S204. The 3D blobs of the end-effectors are generated by matching 2D feature points extracted from multiview 2D images 111, 121 and 131 of the moving figure filmed from different angles, recovering 3D coordinates, and using the recovered 3D coordinates.

Also, the centers of the pixels forming the 3D blobs of the end-effectors are detected, and are designated as the centers of the 3D blobs of the end-effectors.

Planes proximally tangential to the 3D blobs of the bodily end-effectors generated in step S204 are designated as boundaries in step S206. Here, the boundaries, which are proximal to the color pixels of the 3D blobs of the end-effectors and include the color pixel positions of adjacent regions, are regions adjacent to the 3D blobs of the end-effectors. Thus, the boundaries are planes adjacent to the end-effectors of the moving figure.

If the color pixel positions of the regions adjacent to the end-effectors, e.g., clothes, skin, etc., have been stored in step S200, stored color pixel positions of adjacent regions from the boundaries of the clothes adjacent to the 3D blobs of the end-effectors are designated as boundaries.

In step S208, linear joint directions are generated which are perpendicular to the boundaries and include centers of the 3D blobs of the end-effectors. The linear joint directions serve as limiters of the estimated range of possible positions of the joint.

Then, the central points of the 3D blobs of the end-effectors are designated as the central points of the spheres, virtual spheres are generated with radius values of distances between the centers of the end-effectors and the joints, and the virtual spheres are projected onto 2D images of the moving figure in step S210.

Next, the coinciding points between the multiview 2D images of the moving figure obtained in step S200 and the surfaces of the virtual spheres projected in step S210 are detected using linear joint directions, and 3D positions corresponding to the coinciding points are designated as 3D positions of the joints in step S212. The process of detecting the coinciding points involves designating a predetermined margin from the multiview 2D images of the moving figure to the linear joint directions, and searching for points where the pixels of the moving figure and the projected virtual spheres.

The estimated 3D positions of the joints in step S212 are projected onto the 2D images using a camera projective matrix to generate virtual bodily part images including the 3D positions of the joints, and verify the estimated 3D positions of the joints by matching the generated virtual bodily part images to the silhouette images of only the moving figure in step S214.

An elbow joint will be taken as an example to describe the 3D position detecting process in further detail.

Figure 3:
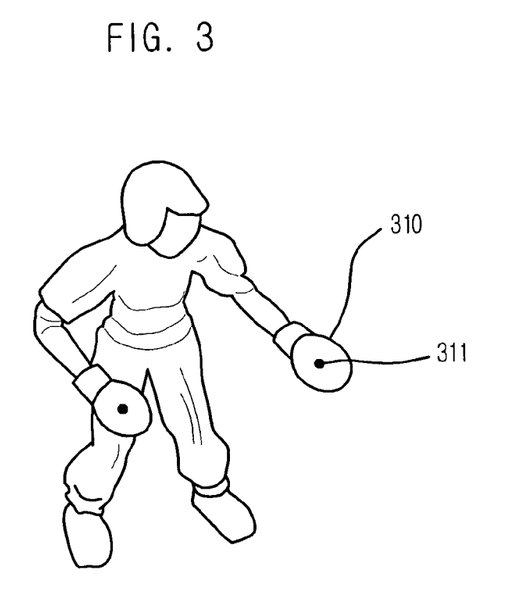
FIG. 3 is a perspective view illustrating a process of generating a 3D hand blob in the method for estimating the 3D position of human joint using the sphere projecting technique in accordance with an embodiment of the present invention.

FIG. 3 is a perspective view illustrating a process of generating 3D hand blob in the method for estimating the 3D position of human joint using the sphere projecting technique in accordance with an embodiment of the present invention.

2D feature points are extracted from images of a moving FIG. 100, and the extracted 2D feature points are matched three-dimensionally to recover 3D coordinates in step S202.

Then, as shown in FIG. 3, the 3D coordinates recovered in step S202 are used to generate a 3D hand blob 310 including hand position and volume data. That is, the 3D hand blob 310 is generated by recovering 3D coordinates from the matched 2D feature points extracted from the multiview 2D images 111, 121 and 131 of the moving figure filmed from different angles.

Figure 6:
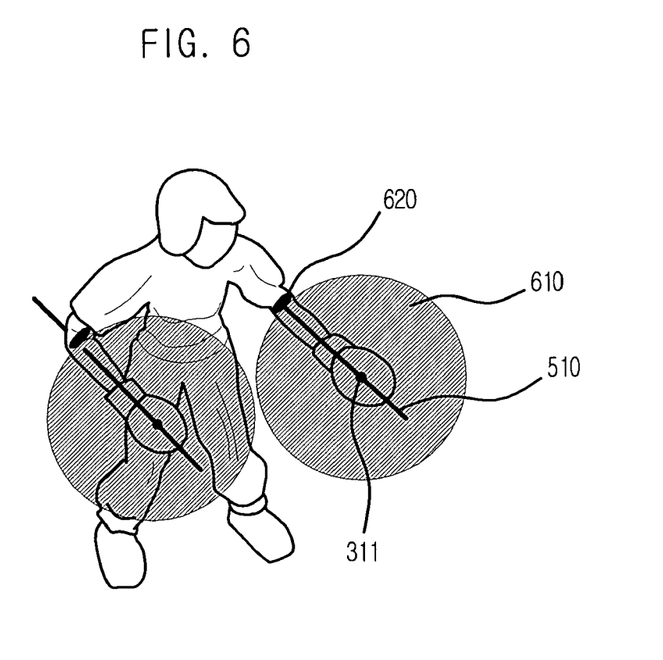
FIG. 6 is a perspective view illustrating a process of generating a virtual sphere in the method for estimating the 3D position of human joint using the sphere projecting technique in accordance with an embodiment of the present invention.

A central point from the pixels forming the 3D hand blob 310 is used as the central point 311 of the 3D hand blob 310, and the central point 311 of the 3D hand blob 310 is used to form a lower arm line shown in FIG. 6.

Figure 4:
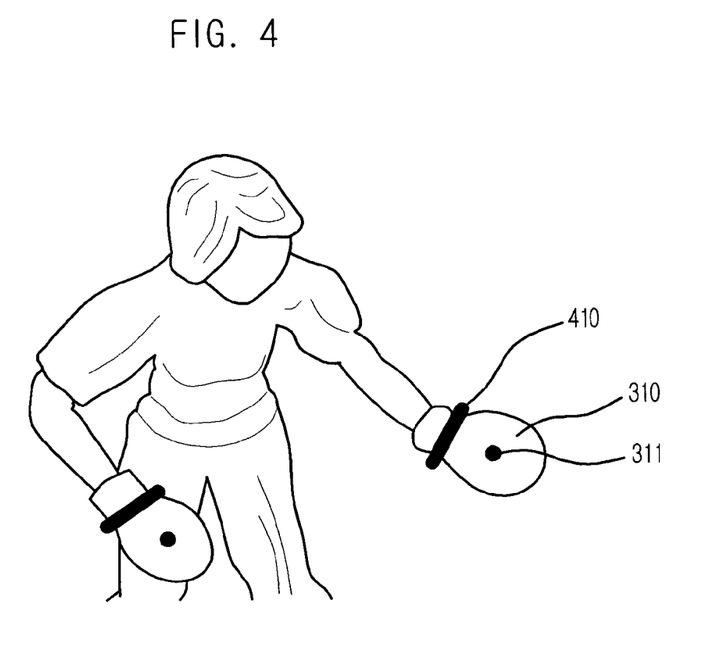
FIG. 4 is a perspective view illustrating a process of estimating a wrist position in the method for estimating the 3D position of human joint using the sphere projecting technique in accordance with an embodiment of the present invention.

FIG. 4 is a perspective view illustrating a process of estimating a wrist position in the method for estimating the 3D position of human joint using the sphere projecting technique in accordance with an embodiment of the present invention.

A plane forming a boundary adjacent to the 3D hand blob 310 is estimated as a 3D wrist. The 3D wrist 410 is a boundary adjacent to the 3D hand blob 310 and a plane adjacent to the hand portion of the moving figure. If the 3D wrist 410 stores color pixels of clothing adjacent to the color pixels of the hand when the 3D blob 310 is generated, the color pixels of the clothing adjacent to the 3D hand blob 310 are stored immediately after the 3D hand blob 310 is generated, so that a quick and easy estimation of the wrist plane can be achieved.

Figure 5:
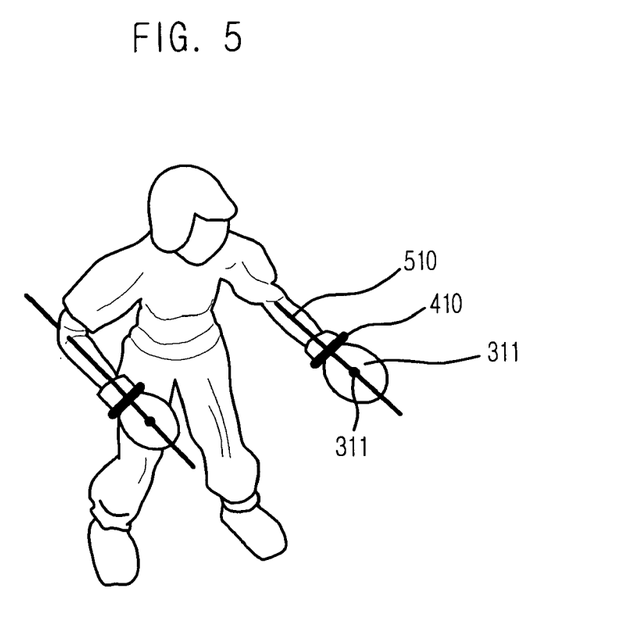
FIG. 5 is a perspective view illustrating a process of generating a 3D lower arm line in the method for estimating the 3D position of human joint using the sphere projecting technique in accordance with an embodiment of the present invention.

FIG. 5 is a perspective view illustrating a process of generating the 3D lower arm line in the method for estimating the 3D position of human joint using the sphere projecting technique in accordance with an embodiment of the present invention.

Referring to FIG. 5, a lower arm line 510 is generated which is perpendicular to the 3D wrist 410, includes the central point 311 of the 3D hand blob 310 and is parallel to the lower arm. The generated lower arm line 510 performs the function of limiting a search range when detecting 3D positions of the elbow joint according to the present invention.

If the color pixels at the boundary adjacent to the 3D hand blob 310 of the moving FIG. 100 are not distinguished, for example, if the moving figure is wearing short sleeves, it is difficult to accurately estimate the boundary. Accordingly, when the color and type of pixels at the boundary adjacent to the 3D hand blob 310 are similar, a straight line between the 3D hand blob 310 and the skin region connected thereto is obtained to generate the lower arm line 510 of the moving FIG. 100.

FIG. 6 is a perspective view illustrating a process of generating the virtual sphere in the method for estimating the 3D position of human joint using the sphere projecting technique in accordance with an embodiment of the present invention.

Referring to FIG. 6, the center of the 3D hand blob 310 is made to be the center of a virtual sphere 610 that is generated by taking the distance value from the center of the hand to the elbow joint as its radius. The virtual sphere 610 is projected onto the multiview 2D images of the moving figure.

A predetermined margin from the multiview 2D images in an inclined direction of the lower arm line 510 is used for detection, and a point where the pixels forming the moving figure from the 2D moving figure images meet the projected virtual sphere 610 is estimated as the 3D position of the elbow joint 620.

Figure 7:
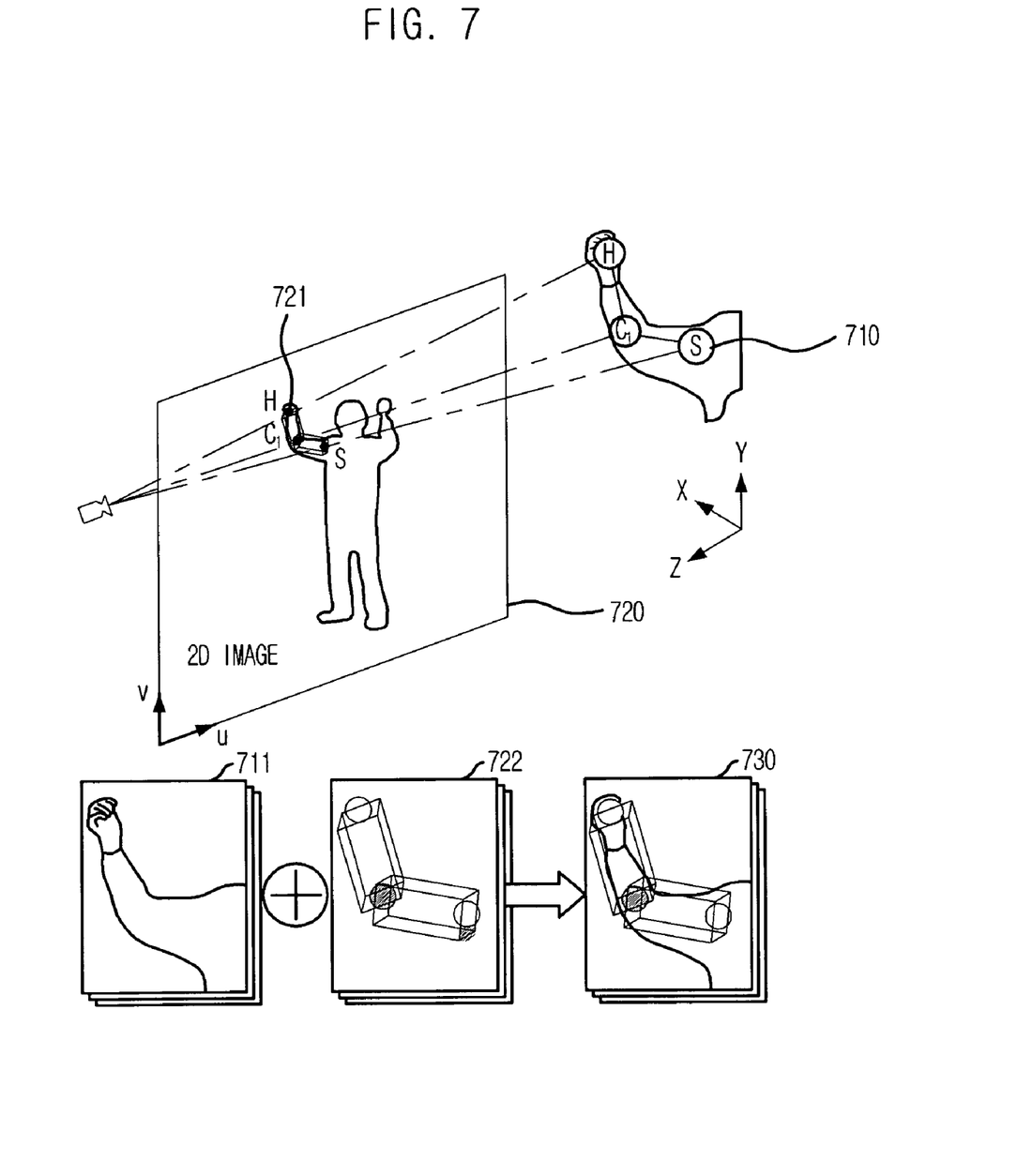
FIG. 7 is a view illustrating a 2D projecting process in the method for estimating the 3D position of human joint using the sphere projecting technique in accordance with an embodiment of the present invention.

FIG. 7 is a view illustrating a process of verifying the 3D position in the method for estimating the 3D position of human joint using the sphere projecting technique in accordance with an embodiment of the present invention.

Referring to FIG. 7, the elbow joint 620 estimated in step S212 is projected onto a 2D image 720 using a camera projective matrix to generate a virtual arm 721 including the estimated elbow joint position, and verify the estimated elbow 3D position through a match 730 of a detected moving figure silhouette 711 and a projected virtual arm image 722 in step S214.

As another embodiment of the present invention, a method for estimating the 3D position of a knee joint using a spherical projecting technique will be described, focusing on the difference from the method described in FIG. 3.

The difference in the method of detecting a 3D position of a human joint when applied to detecting a 3D position of a knee joint is that the 3D position is estimated by limiting its range to a virtual sphere with a radius that is the distance from the center of a heel to the knee. The end-effector is the end of the heel, and the boundary is the ankle; and these are used to define the radius of the virtual sphere.

In steps S200 to S204, the same methods are used to generate a 3D blob of the end-effector. The only difference is that a 3D blob of a heel included in the 3D blobs of feet from the generated 3D end-effectors is extracted.

The central point of the extracted 3D heel blob is obtained in step S206, and the boundary adjacent to the 3D heel blob is estimated as the ankle. The ankle is the point adjacent to the 3D heel blob, and is a plane adjacent to the heel of the moving figure.

A linear joint direction perpendicular to the boundary and including the central point of the 3D heel blob is generated in step S208.

In step S210, a virtual sphere is generated by making its center the 3D heel blob and the distance value from the center of the heel to the knee its radius, whereupon the virtual sphere is projected onto the multiview images of the moving figure.

In step S212, a search is conducted with a predetermined margin with respect to a knee direction line segment, and the 3D position corresponding to the coinciding point is estimated as the 3D position of the knee joint.

In step S214, the 3D leg portion including the position of the knee joint is projected on the 2D images using a camera projective matrix to generate a virtual leg portion, and the 3D position of the knee joint is verified through matching a silhouette image of the figure separated from the background to the virtual leg portion projected on the 2D image.

As described above, the present invention uses marker-free motion capture to generate a virtual sphere with a radius that is the distance from a center of an end-effector to a joint, and detects where the virtual sphere intersects with the pixels forming a moving figure, in order to quickly and easily detect a 3D position of the joint by using motion capture without markers or sensors.

Also, the present invention uses a sphere projecting method to detect the 3D position of a human joint in real time and more accurately than through the conventional inverse kinematics method.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application Nos. 2005-0116140 and 2006-0045045, filed with the Korean Intellectual Property Office on Dec. 1, 2005, and May 19, 2006, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for estimating three-dimensional (3D) positions of human joints using a sphere projecting technique, comprising the steps of:
   a) marker-free motion capturing a moving figure for obtaining a multiview 2D image of the moving figure, and extracting a 2D feature point corresponding to a bodily end-effecter from the obtained multiview 2D image of the moving figure;
   b) three-dimensionally matching the 2D feature point corresponding to the bodily end-effecter, and recovering the 3D coordinates of the bodily end-effecter;
   c) generating a 3D blob of the bodily end-effecter by using the recovered 3D coordinates, generating a virtual sphere with a radius that is a distance from a center of the 3D blob to a joint, and projecting the virtual sphere onto the obtained multiview 2D image of the moving figure;
   d) detecting a coinciding point of a surface of the projected virtual sphere and the multiview 2D image of the moving figure, and estimating a 3D position corresponding to the coinciding point as a 3D position of the joint;

wherein the step a) comprises the steps of:
   a1) calculating mutual positions, dispositions, and focal distances of each of a plurality of cameras positioned at different angles, and calibrating the plurality of cameras according to measured criteria;
   a2) marker-free capturing the moving figure by using the plurality of cameras and obtaining a multiview 2D image of the moving figure, and extracting 2D feature points of the bodily end-effecter from the obtained multiview 2D image of the moving figure; and
   a3) calculating a joint distance from a center of the bodily end-effecter to the joint, obtained from the multiview 2D image of the moving figure; and wherein the step a3) comprises the step of measuring an arm reach length corresponding to a length between centers of either hand of outstretched arms of the moving figure from the obtained multiview 2D image of the moving figure when detecting the 3D position of an elbow joint from the human joints, and calculating a distance between a center of a hand and an elbow joint thereof using a ratio of the measured arm reach length to a length of the body.

2. The method as recited in claim 1, further comprising the steps of:
   d) projecting the estimated 3D position onto the 2D image using a camera projective matrix and generating a virtual bodily part image including the 3D position of the joint; and
   e) verifying the estimated 3D position of the joint by matching the generated virtual bodily part image to a silhouette image of only the moving figure.

3. The method as recited in claim 1, wherein the step c) comprises the steps of:
   c1) generating a 3D end-effecter blob using the 3D coordinates of the bodily end-effecter;
   c2) estimating a plane at a junction of the 3D blob of the bodily end-effecter and an adjacent region as a boundary;
   c3) generating a linear joint direction that is perpendicular to the estimated boundary and includes the center of the 3D blob of the bodily end-effecter;
   c4) designating the center of the 3D blob of the bodily end-effecter as a center of a virtual sphere, and generating the virtual sphere with a radius that is a length between the center of the bodily end-effecter and a respective joint; and
   c5) projecting the virtual sphere on the multiview 2D image of the moving figure.

4. The method as recited in claim 1, wherein the step c) comprises the step of generating the linear joint direction by using the center of the 3D blob, and the step d) comprises the step of detecting the coinciding point of the projected virtual sphere and the multiview 2D image of the moving figure with a predetermined margin with respect to the linear joint direction.

5. The method as recited in claim 1, wherein the step c) comprises the steps of:
   c1) generating a 3D hand blob by using the 3D coordinates of the bodily end-effecters;
   c2) estimating a plane of intersection between the 3D hand blob and an adjacent region as a 3D wrist plane;
   c3) generating a lower arm line perpendicular to the 3D wrist plane and including a center of the 3D hand blob;

c4) designating the center of the 3D hand blob as a center of the sphere, and generating a virtual sphere with a radius that is the distance between the center of the hand and the elbow; and c5) projecting the virtual sphere on the multiview 2D image of the moving figure.

6. The method as recited in claim 5, wherein the step c2) comprises the step of storing color pixel positions of the hand and color pixel positions adjacent thereto and estimating color pixel positions of the plane of intersection between the 3D hand blob and the adjacent region as the 3D wrist plane.

7. The method as recited in claim 5, wherein the step c3) comprises the step of estimating a straight portion of a skin region extending from the center of the 3D hand blob as the lower arm line, when there is no color difference between color pixels of the 3D hand blob and the lower arm.

8. The method as recited in claim 2, wherein the step c) comprises the steps of:

c1) generating a 3D end-effecter blob using the 3D coordinates of the bodily end-effecter;

c2) estimating a plane at a junction of the 3D blob of the bodily end-effecter and an adjacent region as a boundary;

c3) generating a linear joint direction that is perpendicular to the estimated boundary and includes the center of the 3D blob of the bodily end-effecter;

c4) designating the center of the 3D blob of the bodily end-effecter as a center of a virtual sphere, and generating the virtual sphere with a radius that is a length between the center of the bodily end-effecter and a respective joint; and c5) projecting the virtual sphere on the multiview 2D image of the moving figure.

9. The method as recited in claim 2, wherein the step c) comprises the step of generating the linear joint direction by using the center of the 3D blob, and the step d) comprises the step of detecting the coinciding point of the projected virtual sphere and the multiview 2D image of the moving figure with a predetermined margin with respect to the linear joint direction.

10. The method as recited in claim 2, wherein the step c) comprises the steps of:

c1) generating a 3D hand blob by using the 3D coordinates of the bodily end-effecters;

c2) estimating a plane of intersection between the 3D hand blob and an adjacent region as a 3D wrist plane;

c3) generating a lower arm line perpendicular to the 3D wrist plane and including a center of the 3D hand blob;

c4) designating the center of the 3D hand blob as a center of the sphere, and generating a virtual sphere with a radius that is the distance between the center of the hand and the elbow; and c5) projecting the virtual sphere on the multiview 2D image of the moving figure.

11. The method as recited in claim 10, wherein the step c2) comprises the step of storing color pixel positions of the hand and color pixel positions adjacent thereto and estimating color pixel positions of the plane of intersection between the 3D hand blob and the adjacent region as the 3D wrist plane.

12. The method as recited in claim 10, wherein the step c3) comprises the step of estimating a straight portion of a skin region extending from the center of the 3D hand blob as the lower arm line, when there is no color difference between color pixels of the 3D hand blob and the lower arm.

* * * * *